United States Patent
Xu et al.

(10) Patent No.: US 6,465,129 B1
(45) Date of Patent: Oct. 15, 2002

(54) LITHIUM BATTERIES WITH NEW MANGANESE OXIDE MATERIALS AS LITHIUM INTERCALATION HOSTS

(75) Inventors: Jun Xu, Minneapolis, MN (US); Boone B. Owens, Wrightsville Beach, NC (US); William H. Smyrl, New Brighton, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 0 days.

(21) Appl. No.: 09/303,309

(22) Filed: Apr. 30, 1999

Related U.S. Application Data
(60) Provisional application No. 60/083,936, filed on May 1, 1998.

(51) Int. Cl.$^7$ ................................................ H01M 4/50
(52) U.S. Cl. ........................ 429/224; 423/599; 423/605
(58) Field of Search ........................ 429/224; 423/599, 423/605; 204/157.42

(56) References Cited

U.S. PATENT DOCUMENTS

| | | | |
|---|---|---|---|
| 5,558,961 A | * 9/1996 | Doeff et al. | 429/224 |
| 5,601,952 A | 2/1997 | Dasgupta et al. | 429/224 |
| 5,604,057 A | 2/1997 | Nazri | 429/224 |
| 5,672,329 A | 9/1997 | Okada et al. | 423/599 |
| 5,674,644 A | 10/1997 | Nazri | 429/224 |
| 6,268,085 B1 | * 7/2001 | Manthiram et al. | 429/224 |

OTHER PUBLICATIONS

New Maganese Oxide Materials as Lithium Intercalation Hosts, Abstract No. 81, no date.
Sol–Gel Synthesis of Manganese Oxides, Journal of Solid State Chemistry 88, 325–333 (1990).
3–Volt Manganese Dioxide: the Amorphous Alternative. Dept. of Chemistry, University of Waterloo, no date.
Helena P. Stadniychuk et al., Department of Chemical Engineering and Materials Science, University of Minesota, J. Electrochem. Soc. vol. 143, No. 5, May 1996.
A Manganese Oxyiodide Cathode for Rechargable Lithium Batteries., Jaekook Kim & Arumugam Manthiram, Center for Materials Science and Engineering, Nature, vol. 390, Nov. 20, 1997.

* cited by examiner

*Primary Examiner*—Laura Weiner
(74) *Attorney, Agent, or Firm*—Vidas, Arrett & Steinkraus, PA

(57) ABSTRACT

Amorphous manganese dioxide cathodes for lithium batteries with lithium metal or other lithium-containing anodes, the cathode being synthesized by a sol-gel approach involving reduction of sodium permanganate with fumaric acid disodium salt carried out at room temperature to ensure an amorphous structure. The resulting amorphous manganese dioxide has a nanoporous structure and a high internal surface area of 350 m$^2$/g. The amorphous manganese dioxide can electrochemically intercalate more than 1.6 moles of lithium per mole of manganese, and its theoretical capacity is 2 moles of lithium per mole of manganese. The host structure remains amorphous in the entire intercalation range and the intercalation process is reversible. Lithium battery cathodes comprising the amorphous manganese dioxide, a carbon powder and a binder provide a charge capacity in the level of 436 mAh/g and store energy at the level of 1056 mWh/g. Copper doped amorphous manganese oxides showed significant improvement in cycling performance.

4 Claims, 11 Drawing Sheets

60 μm

10 μm

LITHIUM BATTERIES WITH NEW MANGANESE OXIDE MATERIALS AS LITHIUM INTERCALATION HOSTS

CROSS-REFERENCE TO RELATED APPLICATIONS

This application is a Utility Application claiming priority to Provisional Application No. 60/083,936 filed May 1, 1998, the entire contents of which is hereby incorporated by reference.

STATEMENT REGARDING FEDERALLY SPONSORED RESEARCH OR DEVELOPMENT

The invention herein described was made under subcontract RFP#ARO BAA(DAA-H04-93-R-BAA10) supported by the ARO/IIT Minority Hub Center.

BACKGROUND OF THE INVENTION

Lithium is intercalated into many host materials. These materials include manganese oxides.

Sol-gel processing has become a common method to prepare macromolecular inorganic network materials via hydrolysis and condensation reactions that start from molecular precursors such as organometallic compounds or inorganic salts.

Recent reports have described the increasing worldwide research and development studies of rechargeable lithium (and lithium-ion) batteries that are currently underway.

Idoka, et al., *Science* 276, 1395 (1997) focused attention on tin-based amorphous oxide, while Sato, et al., *Science* 264, 556 (1994) described intercalation into disordered carbons, both of which serve as negative electrodes in lithium-ion cells. The reports have cited the importance of high energy cells for use in portable electronic devices and in electric vehicles. In the latter, the incentive is to lower pollution and the toxic load on the environment.

The positive counter-electrode (cathode) is also of importance, and is usually an intercalation material as well in which the chemical potential of lithium is lower than in pure lithium by several electron volts. Out of the large number of candidate cathode materials, the selection for specific applications is driven by considerations of cost, toxicity, and performance. In addition, the driving range is of major concern for electric vehicles that are powered by rechargeable batteries. Due to their low cost and low toxicity, manganese oxide materials have emerged as important alternatives to the present high energy cathodes based on lithiated cobalt and nickel oxides. This application focuses on synthesis and properties of nanoporous amorphous manganese dioxide, and its various modifications, as a reversible intercalation host for lithium. The amorphous materials of this invention do not suffer from the irreversible phase changes that are characteristic of the crystalline hosts and which limit their performance. The intercalation capacity and specific energy of the amorphous material exceed that of any crystalline manganese oxide, reported either as spinels, see Thackeray, M. M., David W. I. F., Bruce, P. G., and Goodenough, J. B., *Materials Res. Bull.* 18 451–472 (1983); Tarascon, J. M., Guyomard, D., *Electrochimica Acta* 38, 1221–1231 (1993); Pistoia, G., and Wang, G., *Solid State Ionics* 66, 135–142 (1993), or as layered materials by Armstrong, A. R., and Bruce, P. G., *Nature* 381, 499 (1996). Another amorphous material, manganese oxyiodide, has been reported very recently by Kim, J., and Manthiram, A., *Nature* 390, 265 (1997), and comparisons with the present material will be discussed further below.

Manganese oxides are among the most attractive cathode candidates for lithium batteries. Among the advantages they offer are low cost and relative non-toxicity, in addition to superior electrochemical properties such as high voltages. The most extensively studied form of manganese oxide cathodes is $LiMn_2O_4$ of spinel structure. Up to ca. 0.5 moles of lithium per mole of Mn can be intercalated reversibly into this cathode either in the 4 V region (x=0 to 1, $Li_xMn_2O_4$) or in the 3 V region (x=1 to 2, $Li_xMn_2O_4$). Recently another form of lithium manganese oxide, $LiMnO_2$ of layered structure, was reported by Armstrong, A. R. et al, *Nature* 381, 499 (1996). Up to ca. 1 mole of lithium per mole manganese can be electrochemically extracted out of this material during first charge (x=1 to 0, $Li_xMnO_2$); however, the charge/discharge capacity of subsequent cycles is less than 50% of that of the first cycle. It has been subsequently reported that lithium extraction and reinsertion into this material is not a reversible intercalation reaction and that the material is converted from the layered structure to the spinel structure upon cycling, see Vitins, G.; West, K.; *J. Electrochem Soc.*, 144,2587 (1997).

Various methods for preparation of amorphous manganese oxides are known. For example U.S. Pat. No. 5,674,644 assigned to General Motors Corporation is directed to a "Manganese Oxide Electrode and Method", which is specifically directed to a lithium ion cell.

Since this invention and the GM patent are both concerned with nominally "amorphous Manganese Oxide" a comparison of the GM patent and this invention seems warranted. The important differences between the two are:

1. Although the materials covered by the GM patent (hereafter referred to as the GM materials) and the materials of this invention might both be referred to as "amorphous manganese oxide", they are very different materials with different chemical compositions and for different uses.
2. The chemical compositions of the materials of this invention are different from those of the GM materials. The GM materials contain a large amount of lithium or sodium, which is evident from FIG. 6 of the patent. The FIGURE, which is characteristic charge-discharge curves of the GM materials, shows the materials are charged first. That means they contain a large amount of lithium (or possibly sodium) and they are for use as the positive electrode for lithium ion batteries, as claimed throughout the patent. The materials of this invention contain no lithium and only a tiny amount of sodium.
3. The materials of this invention possess much higher charge capacity (milliampere-hour per gram (mAh/g) than the GM materials. The highest capacity among the GM materials is about 240 mAh/g, while the highest capacity of the materials of this invention is 436 mAh/g.
4. The most preferred among the GM materials, including the one that gives the highest capacity, contain electronically conducting polymers, such as polyaniline, mixed with manganese oxide, while the materials of this invention contain no conducting polymers whatsoever.
5. The method for synthesizing the materials of this invention is very different from the method for synthesizing the GM materials as described in the patent, although they can both be referred to as a "sol-gel method." "Sol-gel synthesis (or method)" is very broad and entails different ways of synthesis (like the term "solution synthesis"). Specifically, the GM method involves mixing a solution containing manganese of high valence with a solution containing manganese of low valence, while the method of this invention involves mixing a solution containing manganese of high valence with a solution containing an organic reducing agent (no manganese). Further, the synthesis for this invention involves treatment with an acid such as sulfuric acid to induce a disproportionation reaction, while the GM method involves no such treatment. Still further, the method of this invention involves ultra sonication, while the GM method does not. There are still other differences between the two methods, which need not be described here.

6. In synthesizing the materials of this invention, the synthesis solutions are not heated at all. The entire synthesis process is carried out at room temperature. The synthesized materials in some cases may be heated to around 100° C. before use. In the GM method, the synthesis solution is heated to 80° C. for the synthesis process and the synthesized material is heated to 180° C. before use.

7. The fact that the materials of this invention have different chemical compositions, much higher charge capacities, and are synthesized by a different method (and also most likely have a different crystal nano- and micro-structure), among other different factors, substantiate the difference between the materials of this invention and those of the GM patent.

8. The terms "amorphous manganese oxide (or dioxide)" and "sol-gel method" are generic terms which do not describe specific technical content. There can be many different kinds of materials under the generic term "amorphous manganese oxide (or dioxide)" with different local atomic arrangements and chemical compositions (not all amorphous structures are the same. They are all referred to as "amorphous" only in that X-ray powder diffraction cannot tell a difference among them, but more detailed structural analysis by other techniques will reveal the differences among different "amorphous" structures. Not all "crystalline" structures are the same. Differences among "crystalline" structures can be revealed by the X-ray powder diffraction technique, while the differences among "amorphous" structures cannot be revealed by this technique, but can be revealed by other techniques). Similarly, there can be many different routes of synthesis involving different starting materials (precursors) and processes under the generic term "sol-gel method".

9. In addition to the GM patent, two other patents cover "amorphous manganese oxides" and their use in lithium batteries (U.S. Pat. No. 5,62,329 and U.S. Pat. No. 5,601,952). We also found two Japanese patents JP 01131029 assigned to Nippon Telegraph and Telephone Public Corp. and JP 0167896 assigned to Sony Electric Co., Ltd., that cover "amorphous manganese oxides" and their use in lithium batteries. This suggests that an issued patent on one "amorphous manganese oxide" and its use in lithium batteries does not exclude the patentability of an invention on another "amorphous manganese oxide" and its use in lithium batteries.

BRIEF SUMMARY OF THE INVENTION

Nanoporous amorphous manganese dioxide (a-MnO$_2$) has been synthesized via a room-temperature sol-gel route. The material is a stable intercalation host for lithium and the intercalation capacity is greater than 1.6 moles of Li per mole of MnO$_2$. The host remains amorphous in the entire intercalation range and the insertion process is reversible. When used as an intercalation cathode for lithium batteries, the material yields a charge capacity at the level of 436 mAh/g, and stores energy at the level of 1056 mWh/g. The former figure of merit represents an improvement over crystalline manganese oxide materials by a factor of about 4, and the latter by factors of 2 to 3. Various modifications of the material, such as slightly heated or polyvalent cation doped forms, retain the high capacity and energy of the original material and exhibit improved cycling performance. The above materials can be readily lithiated for use as cathodes for lithium ion batteries as well.

Fumaric Acid Reduction Method

The fumaric acid reduction method is based in part on *J. Electrochem. Soc.* 143:5, May 1996, over which the present method distinguishes. The stated article is directed to preparation of materials for use in alkaline Zn batteries, and is incorporated herein by reference. The entire fumaric acid reduction method described hereinbelow is performed at room temperature to ensure a product having an amorphous structure. Note that the methods of the invention may employ any reducing agent that would function as the fumaric acid disodium salt since the same results could be achieved by using well known substitute reducing agents. Likewise, although sulfuric acid is referred to in the method, other acids can be employed as is well known in the art.

A first solution of sodium permanganate solution, 300 ml of 0.25 M NaMnO$_4$ is prepared. While the first solution is being vigorously stirred, a second solution, 75 ml of 0.300 M fumaric acid disodium salt C$_2$H$_2$O$_4$Na$_2$ is gradually added. The resulting mixture is stirred vigorously overnight to ensure completion of the reduction reaction. Following ultrasonification for six hours at room temperature in a constant-flow water bath which prevents temperature increases, 7.5 ml of 2.50M H$_2$SO$_4$ is added. The resulting mixture is then stirred vigorously overnight, then the precipitates are washed with distilled water. The resulting manganese oxide has manganese of mean oxidation state close to four as determined by a redox titration method using ferrous ammonium sulfate *Handbook of Manganese Dioxides Battery Grade*, International Battery Materials Association (1989). The resulting material is mixed with a carbon powder and a binder, and pellets are made therefrom.

Electrochemical measurements are performed on the resulting pellet(s) which is discharged and cycled in a nonaqueous Li solution such as LiClO$_4$ solution in a suitable organic solvent such as propylene carbonate.

BRIEF DESCRIPTION OF THE DRAWINGS

A detailed description of the invention is hereafter described with specific reference being made to the drawings in which.

DETAILED DESCRIPTION OF THE INVENTION

Amorphous manganese dioxide (a-MnO$_2$) has been synthesized according to this invention into which greater than 0.5 up to 2 moles of Li per mole of Mn can be reversibly intercalated by electrochemical intercalation at lower rates. The theoretical capacity for lithium intercalation into this material is 2 moles of lithium per mole of manganese, which corresponds to reducing the manganese from the quatravalent state to divalent state, the most stable valence state for manganese. The host remains amorphous throughout the intercalation process. The material was synthesized via an aqueous redox sol-gel method, see Bach, S., Henry M., Baffer, N., and Livage J., *Solid State Chem.* 88, 325 (1990); Stadniychuk, H. P., Anderson, M. A., and Chapman, T. W., *J. Electrochem. Soc.* 143, 1629 (1996). Sodium permanganate was used as the precursor reagent and was mixed with a solution of the disodium salt of fumaric acid. The Mn$^{7+}$ species was reduced to species of lower valence, including Mn$^{4+}$ in the form of colloidal MnO$_2$ particles, with Mn$^{3+}$ and Mn$^{2+}$ species. A disproportionation reaction was then induced by the addition of sulfuric acid, where the Mn$^{3+}$ was split into Mn$^{4+}$ (MnO$_2$) and soluble Mn$^{2+}$. After washing to remove Mn$^{2+}$, the manganese dioxide powders were dried under vacuum. The entire synthesis process was carried out at room temperature.

Figure 1A:
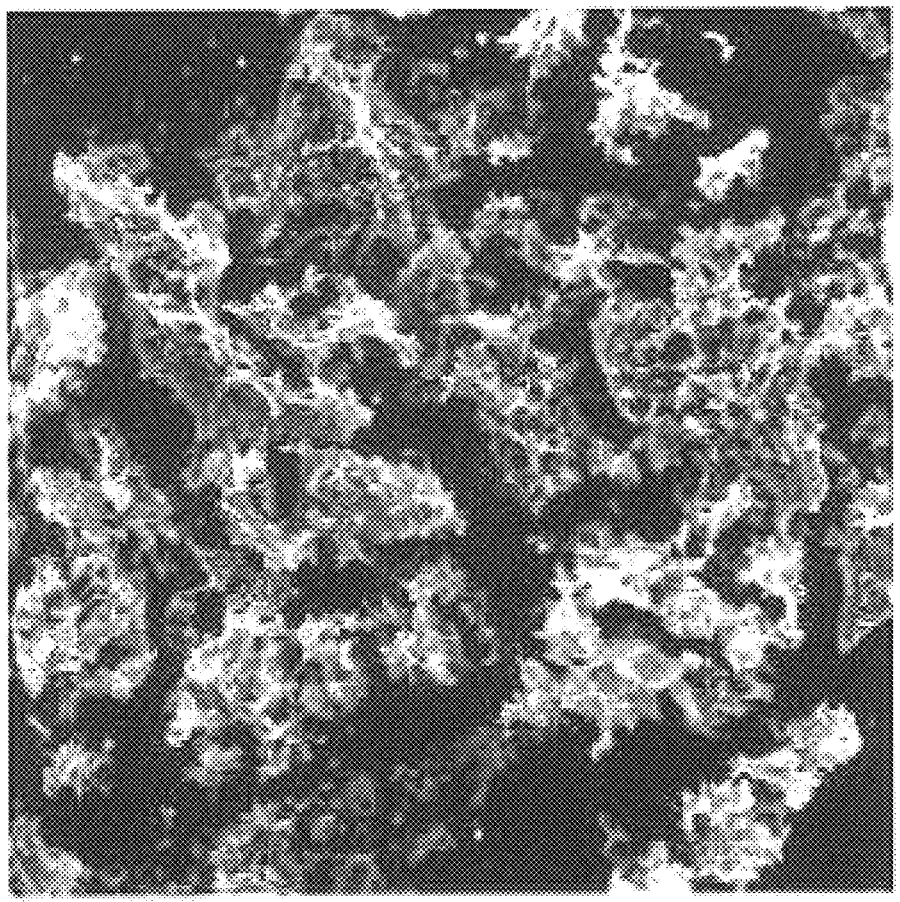
FIG. 1 are scanning electron micrographs of a-MnO$_2$ powder.
Figure 1B:
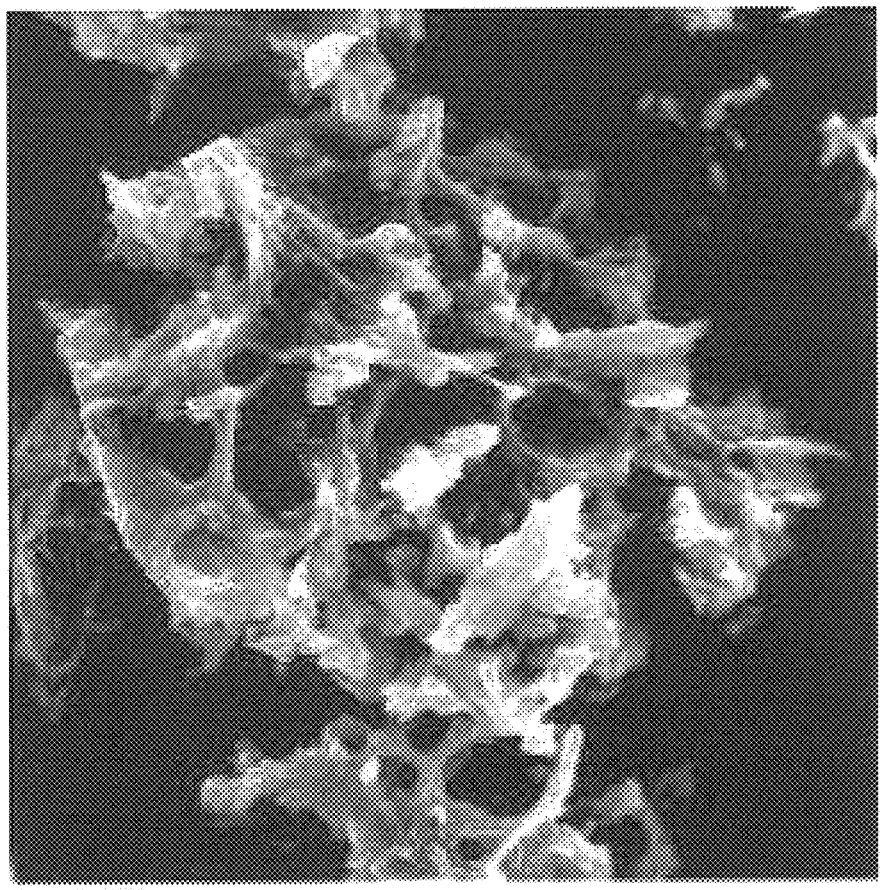
Figure 2:
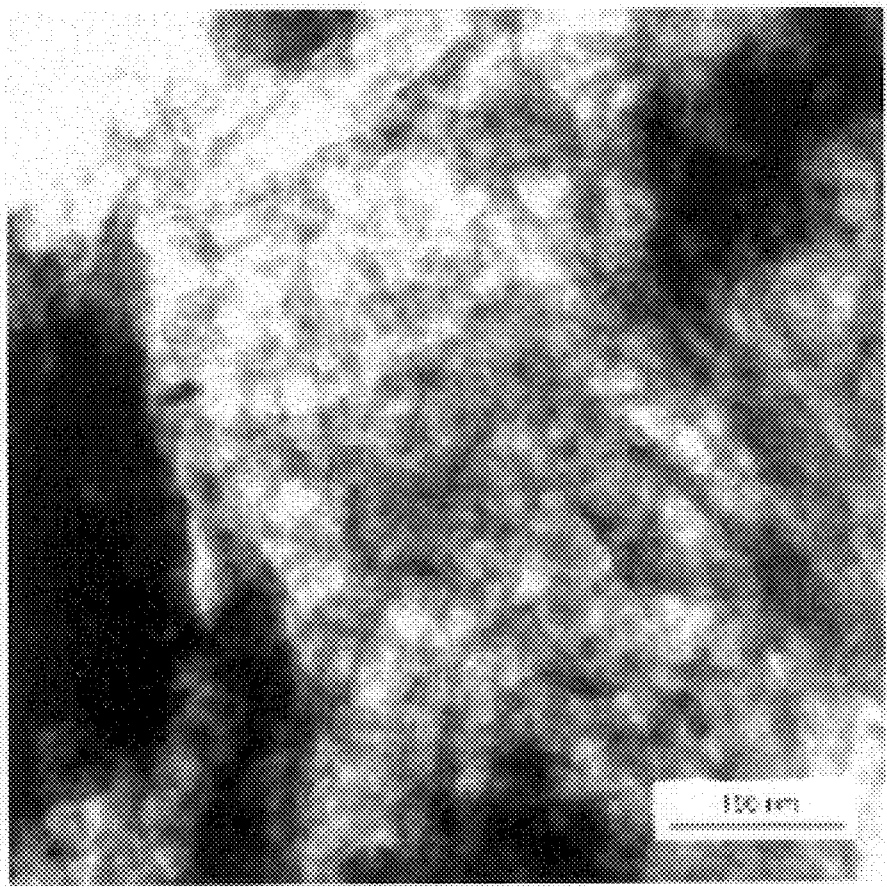
FIG. 2 is a transmission electron micrograph of a-MnO$_2$, the nanoporous structure of the material can be seen.
Figure 3A:
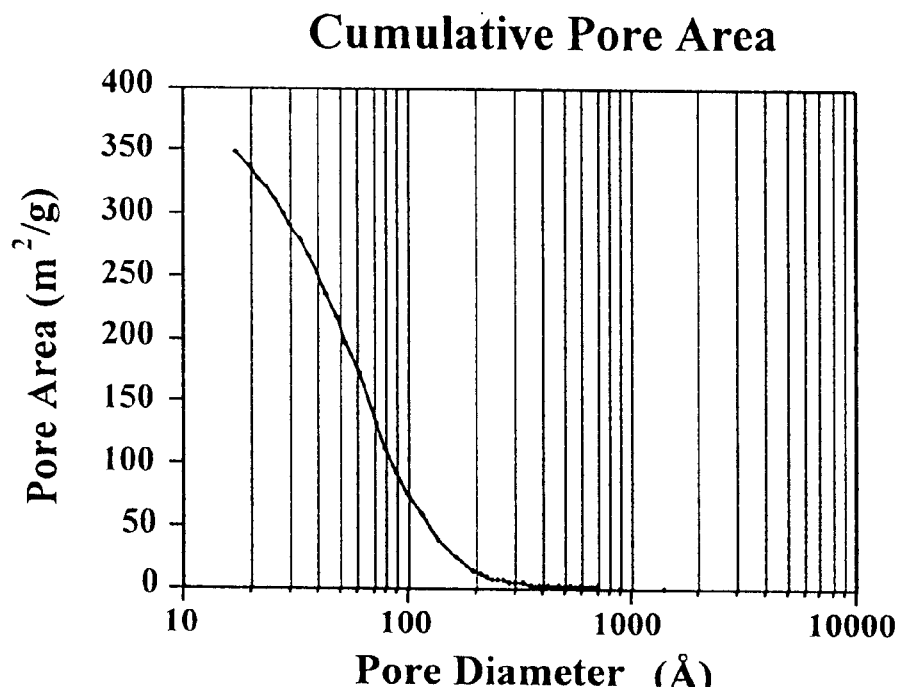
FIG. 3 shows results of the Brunauer, Emmett and Teller (BET) surface area measurement of a-MnO$_2$, (a) plot of cumulative surface area versus pore diameter, (b) plot of differential surface area versus pore diameter; the results reveal the high internal surface area and confirm the nanoporous structure of the material observed in transmission electron microscopy (TEM) (FIG. 2)
Figure 3B:
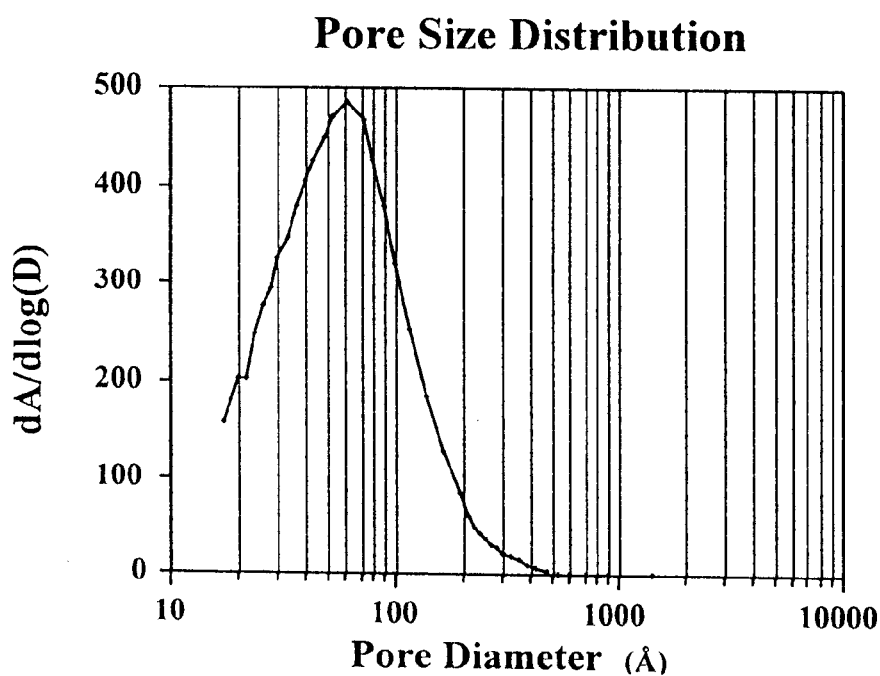
Figure 4:
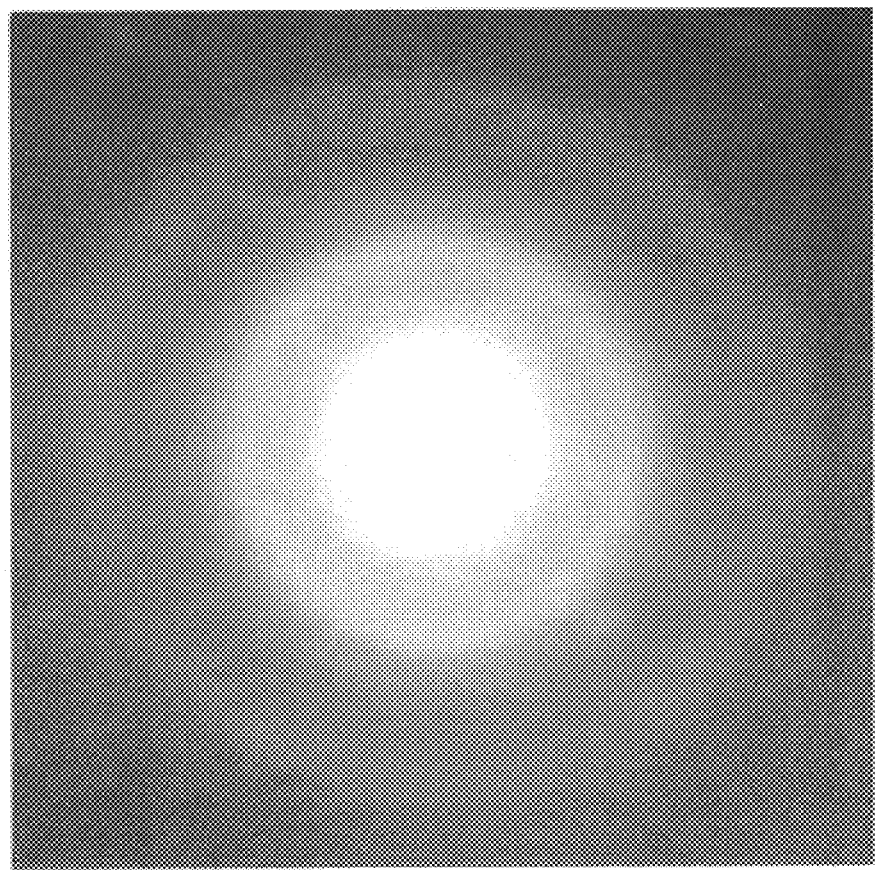
FIG. 4 is a Selected Area Electron Diffraction pattern of a-MnO$_2$ obtained in TEM.
Figure 5:
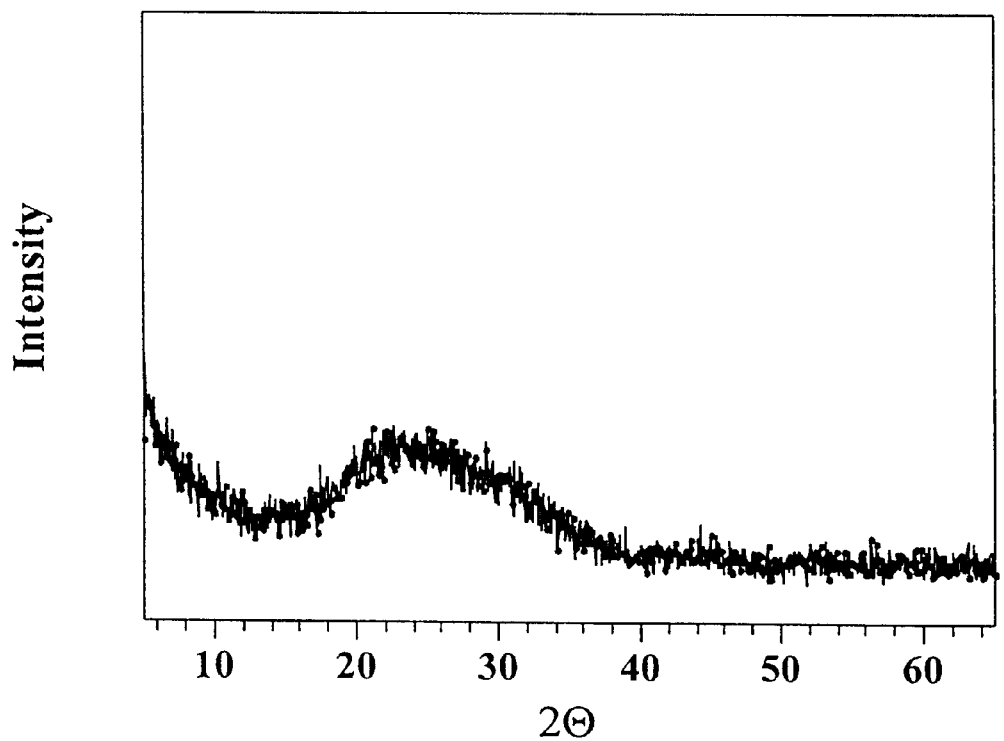
FIG. 5 is an X-ray powder diffraction pattern of a-MnO$_2$ (Cu K$_\alpha$ radiation), the broad peak at 2θ at about 24° is due to the glass sample support.

The chemical composition of the material was determined by ICP/atomic absorption analysis combined with the results of a redox titration using ferrous ammonium sulfate to determine the mean oxidation state of Mn, see *Handbook of Manganese Dioxides Battery Grade*, Glover, D., Schumen, B., Kosawa, A., Ed., Int'l Battery Materials Ass'n (1989). The typical composition was Na$_y$MnO$_x$.nH$_2$O, where y=0.06–0.09, x=1.96–2.02, and n=0.5–0.7. The synthesized material is highly porous at both the micrometer and nanometer scales (FIGS. 1 and 2) and has an internal surface area of 350 m$^2$/g as measured by the Brunauer, Enmert and Teller (BET) technique (FIG. 3). FIG. 4 is the Selected Area Electron Diffraction pattern of the material obtained with TEM. The pattern consists of only weak diff-use rings, indicating its structure at the atomic scale is amorphous. FIG. 5 is the x-ray powder diffraction pattern of the material using Cu K$_\alpha$ a radiation ($\lambda$=1.5418 A). There are no diffraction peaks in the 2$\theta$ range between 5 and 65 degrees, confirming that the material is completely amorphous. Differential thermal analysis (not shown) revealed no phase transitions up to 550° C. where crystallization occurred.

One of the major advantages of the redox sol-gel synthesis method described above is ease of doping. Other elements can be readily introduced into the manganese oxide in a range of compositions by adding another precursor material for the synthesis. In particular, copper doped amorphous manganese oxides were synthesized by adding a solution of copper (II) sulfate to the sodium permanganate precursor solution in appropriate ratios. The rest of the synthesis procedures remained the same as described above. The copper content of the resulting material was determined by ICP/atomic absorption analysis and its amorphous nature confirmed by X-ray powder diffraction.

Cyclic voltammetry was carried out with electrodes comprised of powders of the active material sandwiched in mesocarbon microbead (MCMB) carbon sheets. The porous thin sheet of carbon allows the electrolyte to permeate through and make contact with the particles of the active material, and at the same time, it serves as the current collector. The electrolyte used for CV measurements was 1 M LiAsF$_6$ in propylene carbonate/ethylene carbonate (Grant Chemical) (50:50 by volume). This electrolyte is known to have a wide electrochemical stability window. The LiAsF$_6$ salt (Fluka) was vacuum dried at 60° C. for several days before use.

The Li intercalation capacity of the a-MnO$_2$ and copper doped amorphous manganese oxide materials was investigated by means of electrochemical insertion of Li ions into the host structure. The oxide powder was slightly ground and mixed with a polymer binder such as polytetrafluoroethylene (PTFE) and electronically conductive carbon powder in certain weight ratios (weight percentage of active material, a-MnO$_2$ or copper doped Mn oxides=60–80%, carbon powder=10–30%, PTFE binder=5–15%) and was pressed into a pellet (thickness—ca.200 µm; area—0.38 cm$^2$; weight of contained a-MnO$_2$ was typically 10 mg). The pellet was mounted onto a stainless steel grid and subjected to electrochemical tests in a three-electrode cell, with pure lithium foils serving as both auxiliary and reference electrodes; or in a sealed stainless steel coin cell, with lithium foil as the anode. The electrolyte used consisted of a lithium salt such as LiClO$_4$ (Fluka) dissolved in an anhydrous organic solvent such as propylene carbonate (Fluka), with typical molarity of 1 M. The LiClO$_4$ salt was dried by heating under vacuum at 140° C. for 24 hours before use.

Figure 6:
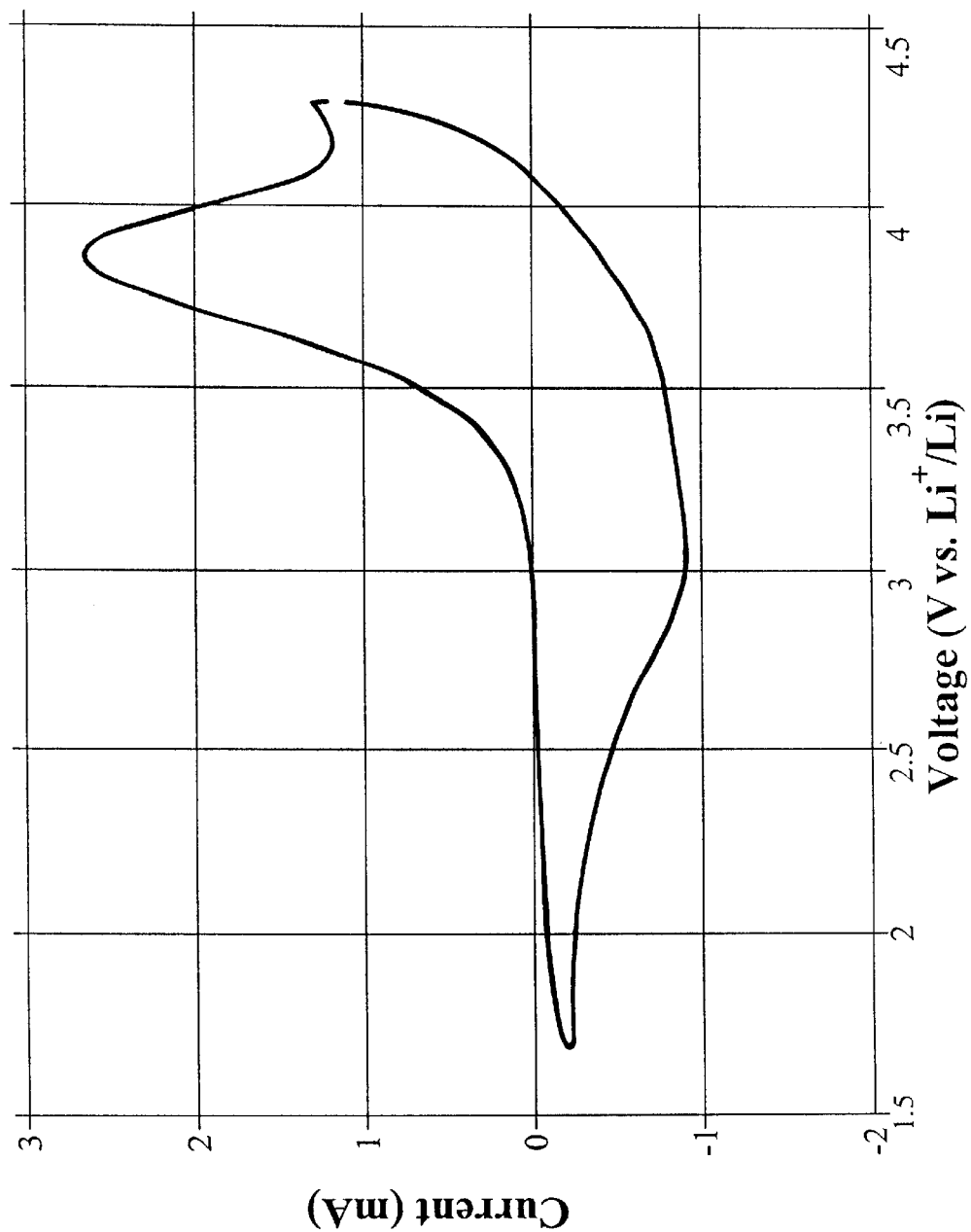
FIG. 6 is a cyclic voltammogram of a-MnO$_2$ obtained between 1.7 and 4.3 V at a scan rate of 0.1 mV/s.

FIG. 6 shows a cyclic voltammogram obtained with particles of the a-MnO$_2$ material sandwiched in a MCMB carbon sheet between 1.7 and 4.3 V at a scan rate of 0.1 mV/s. The shape of the voltammogram is consistent with the amorphous character of the material. One broad peak appears during the insertion (cathodic) scan and one during the release (anodic) scan. The small current rise during the anodic scan at potentials greater than 4.1 V is likely due to electrolyte decomposition. During the cathodic scan, the amount of lithium inserted is about 0.8 moles of Li per mole of Mn. From the shape of the voltammogram, one can see that the intercalation process is reversible. In fact, the ratio of the anodic charge to the cathodic charge is slightly greater than 100%, which indicates that there is an additional contribution to the anodic charge from electrolyte decomposition at high voltages.

Figure 7:
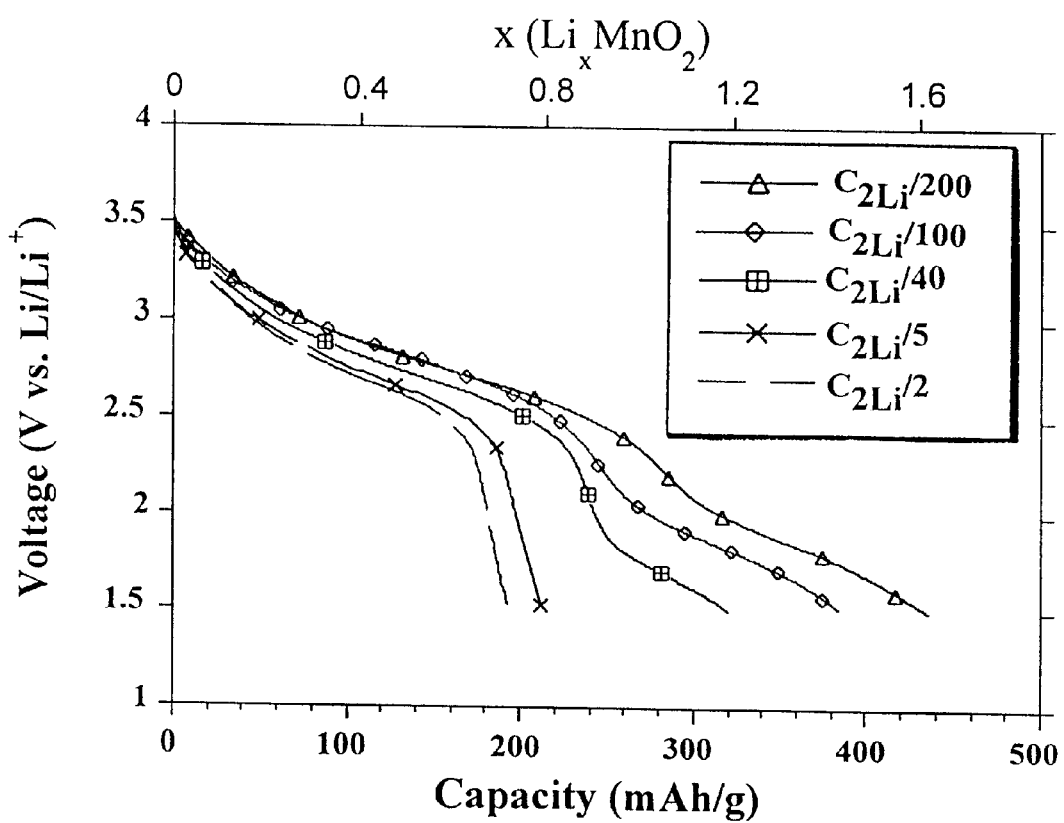
FIG. 7 shows the variation of electrode potential with lithium ion content upon insertion into a-MnO$_2$ at different rates.

FIG. 7 shows the discharge curve of the as-prepared material at different rates. At the highest rate, C/200 for 2 Li per Mn, designated as C$_{2Li}$/200, which corresponds to a current density of 20µA/cm$^2$, up to 1.63 Li per Mn is inserted, giving rise to a charge capacity of 436 mAh/g and a specific energy of 1056 mWh/ gram. The insertion capacity monotonically decreases with increasing rate, indicating diffusion and ohmic limitations of the material and/or the composite electrode. At the highest rate, C$_{2Li}$/2, the capacity is 0.72 Li per Mn, or 192 mAh/g, a drop of 56% from the highest rate. Also of interest is the change of shape of the discharge curve when the rate goes from low to high. At low rates, there is a slope change on the discharge curve, which is likely due to a drop of the lithium diffusion coefficient at high lithium contents. X-ray diffraction carried out at different stages of lithium insertion indicated that the host remained completely amorphous over the entire insertion range. At high discharge rates, since the total amount of lithium inserted is low, the curve has no inflections or shape changes.

Figure 8:
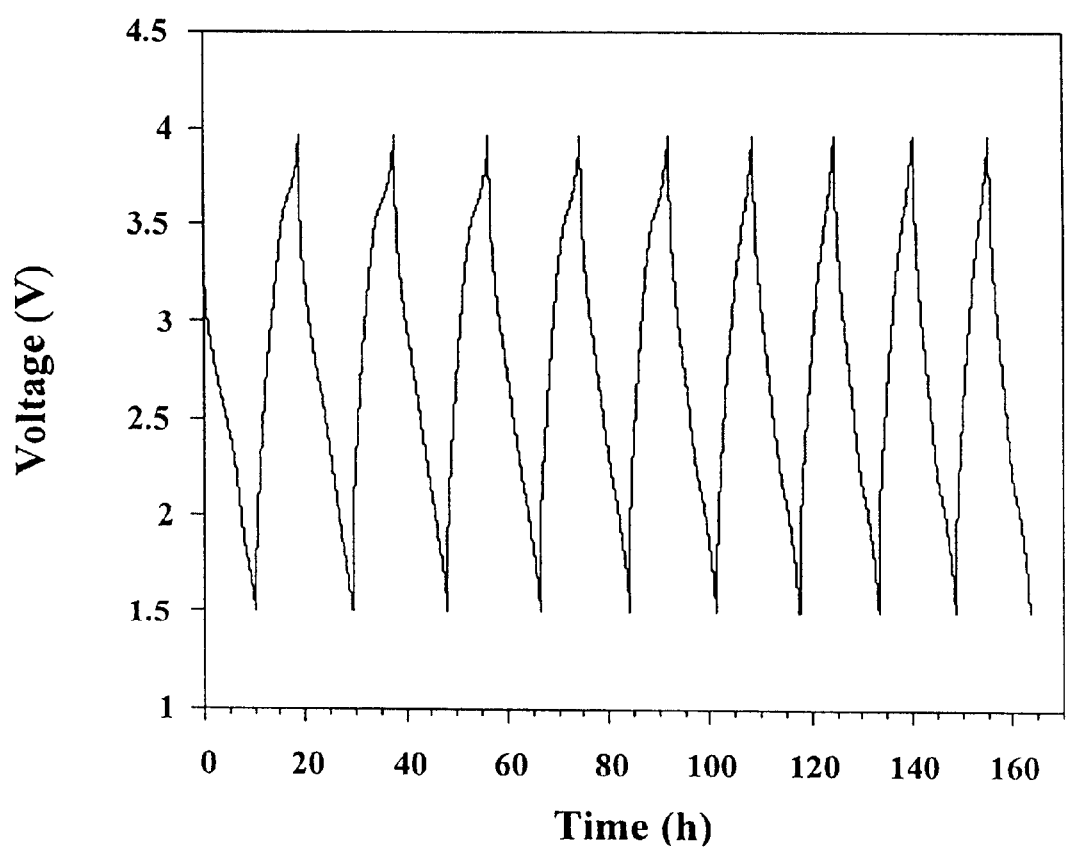
FIG. 8 shows the cycling insertion/release of Li+ions of a-MnO$_2$ at a C$_{2Li}$/20 rate and a current density of 0.20 mA/cm$^2$ and between voltage limits of 4.0 to 1.5 V vs. Li/Li+.

FIG. 8 shows the first ten cycles of insertion/release tests of the composite electrode at $C_{2Li}/20$ rate and a current density of 0.20 mA/cm$^2$. It is seen that lithium intercalation into the amorphous structure was reversible. The initial insertion capacity was 1.04 moles of Li per mole of MnO$_2$ (278 mAh/g) at this rate. For the first insertion/release cycles, the coulombic efficiency (ratio of release capacity to insertion capacity) is 84%. The insertion capacity decreases 2–3% each cycle after the second cycle. It should be noted that structural changes of the electrode pellet including gradual loss of cohesion within the composite electrode may contribute to the decrease of capacity. The intrinsic cyclability of the amorphous manganese oxide should be superior to its crystalline counterpart, not only in that its inherent structure is retained throughout the entire intercalation range as indicated by XRD, but also in that structural fatigue caused by the Jahn-Teller effect should be much less severe. The cyclability of the material will improve after compositional and engineering optimizations.

Figure 9:
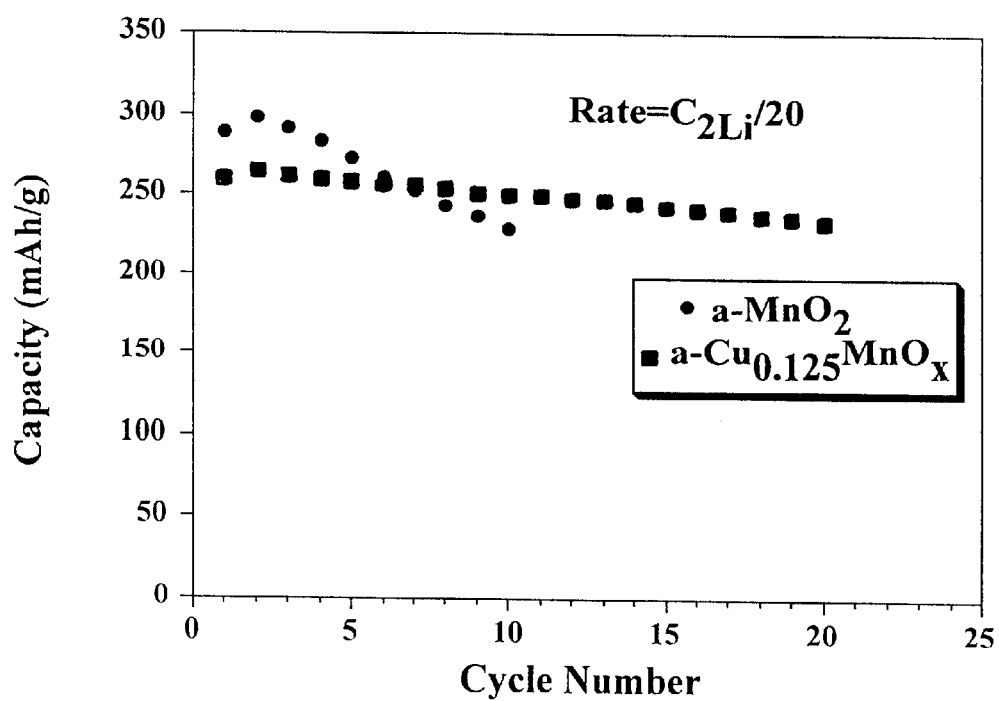
FIG. 9 shows plots of discharge capacity versus cycle number for a-MnO$_2$ and copper doped amorphous manganese oxide (molar ratio of copper to manganese =0.125)

FIG. 9 shows a plot of discharge capacity versus cycle number for a copper doped amorphous manganese oxide in which the copper to manganese ratio is 0.125, designated as a-Cu$_{0.125}$MnO$_2$, in comparison with that for the a-MnO$_2$ material. Both materials were cycled at a $C_{2Li}/20$ rate. It is seen that doping copper into the amorphous manganese dioxide significantly improves its cycling performance. The capacity fading for the a-Cu$_{0.125}$MnO$_2$ material is only about 0.5% each cycle over the first 20 cycles, while that for the a-MnO$_2$ material is 2~3% each cycle over the first 10 cycles. The improvement may be because introducing another element such as copper into the amorphous manganese oxide helps stabilize the local atomic arrangements during intercalation and cycling. Detailed studies on the intercalation mechanisms are under way in our laboratory.

Figure 10:
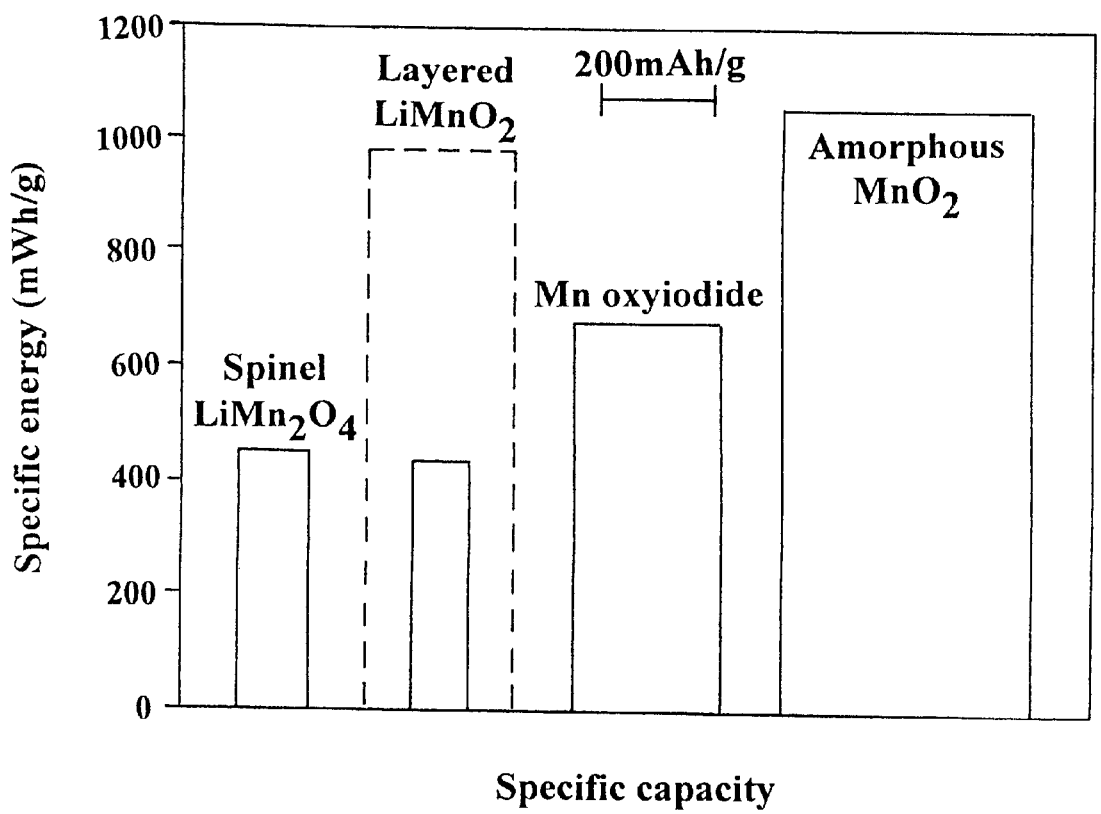
FIG. 10 shows comparisons between a-MnO$_2$ and other Mn intercalation host materials.

The properties of our materials compare favorably with spinel LiMn$_2$O$_4$ (Thackeray, M. M., David W. I. F., Bruce, P. G., and Goodenough, J. B., *Materials Res. Bull.* 18 451–472 (1983); Tarascon, J. M., Guyomard, D., *Electrochimica Acta* 38, 1221–1231 (1993); Pistoia, G., and Wang, G., *Solid State Ionics* 66, 135–142 (1993)) and layered LiMnO$_2$ (Armstrong, A. R., and Bnrce, P. G., *Nature* 381, 499 (1996)), and the amorphous manganese oxyiodide reported recently (Kim, J., and Manthiram, A., *Nature* 390, 265 (1997)). Comparison of the lithium intercalation capacity and energy density is shown in FIG. 10. The layered LiMnO$_2$ loses more than 50% of its capacity and energy density after the first charge (de-insertion). The amorphous oxyiodide has very good cycling properties and higher capacity than the spinel. However, the iodide present in the structure may not be stable for long periods of time, especially at potentials above the oxidation potential for I$^-$/I$_2$. The synthesis of the oxyiodide material is carried out in an organic solvent, acetonitrile, that limits its adoption for industrial scale production. Besides possessing a 68% higher intercalation capacity and a 56% higher energy than the oxyiodide material, the present material is prepared by an aqueous, room temperature route.

The new high capacity manganese oxides are expected to permit a major increase in the specific energy of the next generation of rechargeable lithium batteries and also to lower the cost of such batteries. Both may enable the realization of the age of pollution free vehicles as we enter the twenty first century. Further, there are no toxic heavy metals or cobalt in the material.

BATTERIES

Figure 11:
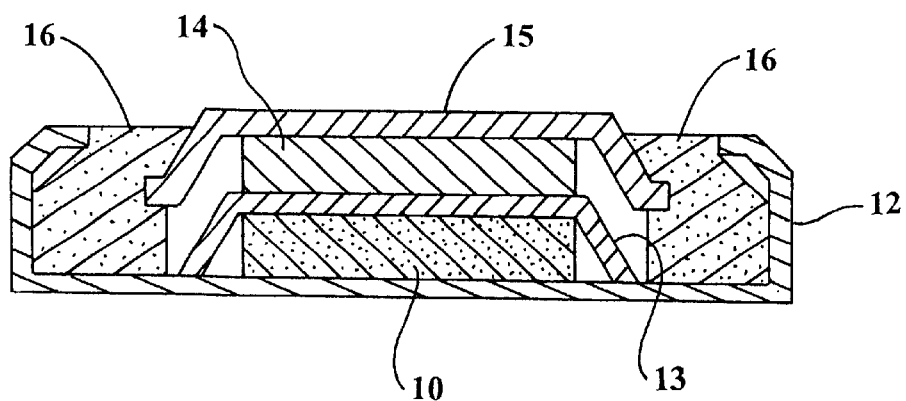
FIG. 11 is a schematic of an exemplary battery making use of the invention.

The materials of the invention when used against a lithium ion producing anode, i.e., any lithium ion source anode in an appropriate battery configuration will provide a superior primary or secondary (rechargeable) lithium battery, such as that shown in FIG. 11, which is of a circular or round configuration and is shown in cross-section.

Such a battery may for example use any of the hereindescribed materials of the invention as a cathode 10 which is placed in a metal container 12 and covered with a separator 13 made of microporous polypropylene glass cloth or the like saturated with an appropriate electrolyte. Many electrolytes are known in the art for lithium batteries such as 1 M solution of LiClO$_4$ in 50:50 ethylene carbonate and dimethoxylethane or 1 M LiClO$_4$ in propylene carbonate. Thereafter, a lithium ion anode source 14 was placed on top of separator 13. The anode may be lithium metal or a composite of lithium and carbon as shown in EP 0561372A1 or any other anode capable of producing lithium ions to the battery. Anode 14 is then covered with a metal closing cover 16 which may be stainless steel as may be container 12. The cover 16 and container 12 are provided with an insulating gasket 16 around the periphery of cover 15 between it and the inside of container 12 to close the battery.

This configuration is meant to be taken as an example only since any configuration may be used and many are known for a wide variety of applications.

Such a battery may be provided in a discharged condition, i.e., lithium inserted into the cathode 10, requiring charging before use. Lithium may be readily inserted electrochemically by polarizing the battery appropriately or inserted chemically as with butyl-lithium.

The inventive materials of the invention may also be used in lithium ion batteries. The amorphous MnO$_2$ is reduced in a straight forward process to Li$_x$MnO$_2$.

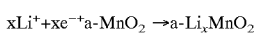

$$xLi^+ + xe^- + a\text{-}MnO_2 \rightarrow a\text{-}Li_xMnO_2$$

The step of lithiating the MnO$_2$ is very straight forward and lithium may be chemically or electrochemically inserted. In the examples already described, the first discharge of the lithium battery causes lithiation, after which the cathode material may be taken out, ground into pellets and used in a lithium ion battery. Thus, a cathode for a lithium battery can be used in a lithium-ion battery if the intercalation cathode material is converted to the L$_i$+-ion inserted structure in a pre-assembly step during battery manufacture.

While this invention may be embodied in many different forms, there are shown in the drawings and described in detail herein specific preferred embodiments of the invention. The present disclosure is an exemplification of the principles of the invention and is not intended to limit the invention to the particular embodiments illustrated.

This completes the description of the preferred and alternate embodiments of the invention. Those skilled in the art may recognize other equivalents to the specific embodiment described herein which equivalents are intended to be encompassed by the claims attached hereto.

What is claimed is:

1. A manganese oxide capable of intercalating lithium ions to the extent greater than 0.5 and up to 2 moles of Li$^+$ ions per mole of manganese wherein the composition of the material is Na$_y$MnO$_x$·nH$_2$O, where y=0.06–0.09, x=1.96–2.02, and n=0.5–0.7.

2. A manganese oxide capable of intercalating lithium ions to the extent greater than 0.5 and up to 2 moles of $Li^+$ ions per mole of manganese wherein the structure of the material at the nanometer scale is porous, the characteristic length of both the pores and of the solid wall material is between about 1 to less than one hundred nanometers.

3. A manganese oxide containing a polyvalent cation that is capable of intercalating lithium ions to the extent greater than 0.5 and up to 2 moles of $Li^+$ ions per mole of manganese wherein the polyvalent cation is copper.

4. A manganese oxide containing a polyvalent cation that is capable of intercalating lithium ions to the extent greater than 0.5 and up to 2 moles of $Li^+$ ions per mole of manganese wherein the molar ratio of copper to manganese is between about 0.1 to about 0.6.

* * * * *

UNITED STATES PATENT AND TRADEMARK OFFICE
CERTIFICATE OF CORRECTION

PATENT NO.    : 6,465,129 B1  
DATED         : October 15, 2002  
INVENTOR(S)   : Jun Xu et al.

Page 1 of 1

It is certified that error appears in the above-identified patent and that said Letters Patent is hereby corrected as shown below:

Column 2,
Line 9, delete "(x = 1 to 2, Li$x$Mn$_2$O$_4$) and insert therefore -- (x = 1 to 2, Li$_x$Mn$_2$O$_4$) --

Signed and Sealed this

Twenty-second Day of July, 2003

JAMES E. ROGAN
*Director of the United States Patent and Trademark Office*